United States Patent
Nick et al.

(10) Patent No.: US 11,162,629 B2
(45) Date of Patent: Nov. 2, 2021

(54) QUICK COUPLING WITH VOLUME DISPLACEMENT PASSAGE

(71) Applicant: Parker-Hannifin Corporation, Cleveland, OH (US)

(72) Inventors: Leonard Nick, Rockford, MN (US); Timothy Marquis, Otsego, MN (US); Paul Lemay, Shoreview, MN (US); Jason Koller, Eden Prairie, MN (US)

(73) Assignee: Parker-Hannifin Corporation, Cleveland, OH (US)

(*) Notice: Subject to any disclaimer, the term of this patent is extended or adjusted under 35 U.S.C. 154(b) by 453 days.

(21) Appl. No.: 15/750,562

(22) PCT Filed: Oct. 5, 2016

(86) PCT No.: PCT/US2016/055430
§ 371 (c)(1),
(2) Date: Feb. 6, 2018

(87) PCT Pub. No.: WO2017/069949
PCT Pub. Date: Apr. 27, 2017

(65) Prior Publication Data
US 2019/0145568 A1    May 16, 2019

Related U.S. Application Data

(60) Provisional application No. 62/244,931, filed on Oct. 22, 2015.

(51) Int. Cl.
*F16L 57/00* (2006.01)
*F16L 55/115* (2006.01)
(Continued)

(52) U.S. Cl.
CPC .......... *F16L 57/005* (2013.01); *E21B 33/038* (2013.01); *F16L 55/115* (2013.01);
(Continued)

(58) Field of Classification Search
CPC ....... F16L 37/33; F16L 55/115; F16L 57/005; F16L 37/0826; F16L 37/086; F16L 37/23;
(Continued)

(56) References Cited

U.S. PATENT DOCUMENTS 2,161,284 A * 6/1939 Crowell .................. E21B 21/10
166/154
2,614,830 A * 10/1952 Mitchell ................... F16F 1/02
267/163
(Continued)

FOREIGN PATENT DOCUMENTS

| DE | 102008017053 | 10/2008 |
| DE | 102009024899 | 2/2010 |
| DE | 102013223047 | 5/2014 |

OTHER PUBLICATIONS

International Search Report of PCT/US2016/055430 dated Jan. 17, 2017, 12 pages.

*Primary Examiner* — Craig J Price
(74) *Attorney, Agent, or Firm* — Renner, Otto, Boisselle & Sklar, LLP (57) ABSTRACT

A quick coupling assembly includes a first coupling element (10) and a second coupling element (50) that is inserted into the first coupling element. The first coupling element has a coupling body (12) and a valve (20), which define a volume displacement passage. When the second coupling element (50) is inserted, the second coupling element mechanically acts on the valve (20) to expel contaminants from the quick coupling assembly via the volume displacement passage. The valve includes a poppet (22) and a biasing spring (24), and the volume displacement passage includes a leak path (66) defined between the coupling body and the poppet. The poppet has an inward contour (68) that is spaced apart from the coupling body to define the leak path. The poppet has a widened portion (70) that provides a sealing surface when (Continued)

the assembly is fully coupled. The second coupling element (50) mechanically acts on the poppet (22) during insertion to expel the contaminants via the volume displacement passage.

14 Claims, 6 Drawing Sheets

(51) Int. Cl.
  *E21B 33/038* (2006.01)
  *E21B 17/02* (2006.01)
  *F16L 37/33* (2006.01)
(52) U.S. Cl.
  CPC .............. *E21B 17/02* (2013.01); *F16L 37/33* (2013.01); *Y10T 137/87957* (2015.04)
(58) Field of Classification Search
  CPC . F16L 37/40; F16L 37/08; F16L 37/30; F16L 37/32; F16L 37/34; F16L 37/35; F16L 37/36; F16L 37/38; F16L 37/407; F16L 37/413; F16L 37/42; F16L 37/44; F16L 37/113; F16L 15/04; F16L 29/00; F16L 29/02; F16L 29/04; F16L 55/1015; F16L 2201/10; F16L 2201/60; F16L 2201/20; F16L 59/188; E21B 33/038; E21B 17/02; Y10T 137/87925–87973; Y10T 137/9029; Y10T 137/9138
  USPC ............ 137/614–614.06, 798, 799; 251/149, 251/149.1, 149.6, 149.7, 149.8, 149.9
  See application file for complete search history.

(56) References Cited

U.S. PATENT DOCUMENTS

| | | | | | |
|---|---|---|---|---|---|
| 3,215,161 | A | * | 11/1965 | Goodwin | F16L 37/23 137/614.04 |
| 3,236,251 | A | * | 2/1966 | Hansen | F16L 37/23 137/614.05 |
| 3,498,324 | A | * | 3/1970 | Breuning | F16L 37/32 137/614.04 |
| 3,570,543 | A | * | 3/1971 | Ekman | F16L 37/32 137/630 |
| 3,687,161 | A | * | 8/1972 | Grguric | B67D 1/0835 137/614 |
| 3,777,771 | A | * | 12/1973 | De Visscher | F16L 29/04 137/1 |
| 3,873,062 | A | * | 3/1975 | Johnson | F16L 37/133 251/149.6 |
| 4,082,112 | A | * | 4/1978 | Schmidt | F16L 37/248 137/614.03 |
| 4,150,691 | A | * | 4/1979 | Maldavs | B60D 1/64 137/614.03 |
| 4,200,121 | A | * | 4/1980 | Walter | F16L 37/32 137/614 |
| 4,222,411 | A | * | 9/1980 | Herzan | F16L 37/23 137/614.04 |
| 4,327,770 | A | * | 5/1982 | Brown | F16L 37/252 137/614.03 |
| 4,388,947 | A | * | 6/1983 | Steuerwald | F16L 37/23 137/557 |
| 4,392,513 | A | * | 7/1983 | Parrish | F16L 55/1015 137/614.01 |
| 4,453,566 | A | * | 6/1984 | Henderson, Jr. | F16L 39/02 137/236.1 |
| 4,612,953 | A | * | 9/1986 | Caroll | B25B 27/0028 137/327 |
| 4,664,148 | A | * | 5/1987 | Magnuson | F16L 37/23 137/614.05 |
| 4,813,454 | A | * | 3/1989 | Smith, III | F16L 37/32 137/614.04 |
| 4,827,977 | A | * | 5/1989 | Fink, Jr. | F16L 55/1015 137/614.04 |
| 4,832,080 | A | * | 5/1989 | Smith, III | F16L 1/26 137/614.04 |
| 4,858,648 | A | * | 8/1989 | Smith, III | F16L 37/32 137/614.04 |
| 5,015,016 | A | * | 5/1991 | Smith, III | F16L 29/04 285/108 |
| 5,044,401 | A | * | 9/1991 | Giesler | F16L 37/32 137/614.03 |
| 5,052,439 | A | * | 10/1991 | Smith, III | F16L 1/26 137/614.04 |
| 5,076,324 | A | * | 12/1991 | Herman | F16L 37/23 137/614.04 |
| 5,099,882 | A | * | 3/1992 | Smith, III | E21B 33/038 137/614.04 |
| 5,232,021 | A | * | 8/1993 | Smith | E21B 33/0355 137/614.04 |
| 5,355,909 | A | * | 10/1994 | Smith, III | F16L 29/04 137/614.04 |
| RE34,781 | E | * | 11/1994 | Spalink | F16L 37/30 137/614.01 |
| 5,360,035 | A | * | 11/1994 | Smith | E21B 33/038 137/614.04 |
| 5,368,070 | A | * | 11/1994 | Bosley | F16L 17/02 137/614.04 |
| 5,390,702 | A | * | 2/1995 | Smith, III | F16L 1/26 137/614.04 |
| 5,479,960 | A | * | 1/1996 | Kirkman | E21B 33/0355 137/614.04 |
| 5,628,344 | A | * | 5/1997 | Roberts | F16L 37/20 137/614 |
| 5,771,927 | A | * | 6/1998 | Johansen | E21B 33/038 137/614.04 |
| 5,881,769 | A | * | 3/1999 | Hopson | F16L 37/35 137/614.05 |
| 6,095,191 | A | * | 8/2000 | Smith, III | F16L 37/002 137/614.04 |
| 6,106,026 | A | * | 8/2000 | Smith, III | F16L 1/26 285/85 |
| 6,123,103 | A | * | 9/2000 | Smith, III | F16L 1/26 137/614.04 |
| 6,148,858 | A | * | 11/2000 | Kirkman | E21B 33/038 137/614.02 |
| 6,202,690 | B1 | * | 3/2001 | Smith, III | F16L 29/04 137/614.04 |
| 6,202,691 | B1 | * | 3/2001 | Smith, III | F16L 1/26 137/614.04 |
| 6,394,131 | B1 | | 5/2002 | Fross et al. | |
| 6,631,734 | B2 | | 10/2003 | Smith, III | |
| 7,063,328 | B2 | * | 6/2006 | Smith, III | F16L 1/26 277/607 |
| 7,117,891 | B2 | * | 10/2006 | Magnus | F16L 29/02 137/614.04 |
| 7,578,312 | B2 | * | 8/2009 | Smith, III | F16L 1/26 137/614.04 |
| 7,673,911 | B2 | * | 3/2010 | Liu | F16L 37/23 285/316 |
| 7,762,525 | B2 | | 7/2010 | Smith, III | |
| 8,960,310 | B2 | | 2/2015 | Webb | |
| 10,400,541 | B2 | * | 9/2019 | Smith, III | E21B 33/035 |
| 10,760,724 | B2 | * | 9/2020 | Ferrera | F16L 37/36 |
| 11,041,568 | B2 | * | 6/2021 | Koller | F16J 15/3264 |
| 2002/0174990 | A1 | | 11/2002 | Smith, III | |
| 2007/0001143 | A1 | * | 1/2007 | Konishi | F16L 37/23 251/149.8 |
| 2008/0290657 | A1 | * | 11/2008 | McKeon, III | A61M 39/18 285/328 |
| 2010/0013218 | A1 | * | 1/2010 | Tiberghien | F16L 37/35 285/335 |
| 2013/0186494 | A1 | * | 7/2013 | Geisei | F16L 37/413 137/798 |
| 2014/0131606 | A1 | | 5/2014 | Smith, III | |

(56) References Cited

U.S. PATENT DOCUMENTS

2015/0267850 A1* 9/2015 Nowack ................ F16L 37/32
　　　　　　　　　　　　　　　　　　　　　251/149.6
2017/0191595 A1* 7/2017 Van Scyoc ............ F16L 29/04
2019/0285181 A1* 9/2019 Koller .................... F16L 37/32

* cited by examiner

QUICK COUPLING WITH VOLUME DISPLACEMENT PASSAGE

RELATED APPLICATION DATA

This application is a national stage application pursuant to 35 U.S.C. § 371 of PCT/US2016/055430 filed on Oct. 5, 2016, which claims the benefit of U.S. Provisional Application No. 62/244,931 filed Oct. 22, 2015, the contents of which are incorporated herein by reference.

FIELD OF INVENTION

The present invention relates generally to quick couplings, and more particularly to multi-couplings for connecting multiple fluid lines in high pressure systems.

BACKGROUND OF THE INVENTION

Quick couplings in general are common devices for coupling fluid lines, without the need for special tools. Quick couplings, for example, may be configured as individual couplings for the connection of a single fluid line. Individual quick couplings typically have a ball locking mechanism to hold two halves of the coupling together as they try to separate from internal pressures. Alternatively, a quick coupling may be configured as a multi-coupling for connecting any number of multiple fluid lines. The multi-coupling constitutes a group of quick couplings mounted together in a plate or casting. In place of an individual locking mechanism for each individual coupling, a multi-coupling typically has a larger centralized locking mechanism that connects and holds the group of couplings together. The mechanical advantage of this single locking mechanism is often needed to overcome the combined forces required to connect all of the quick couplings simultaneously. A centralized locking mechanism may be employed singularly or in combination with one or more satellite locking mechanisms that supplement the operation of the centralized locking mechanism.

Quick multi-couplings may be employed for connecting high pressure fluid lines, often under extreme conditions. For example, quick multi-couplings are employed for connecting multiple hydraulic fluid lines associated with deep water subsea drilling operations. Quick couplings operating in subsea applications encounter corrosive salt water, sand, debris, marine growth, calciferous deposits, and more damaging contaminants. Quick couplings have delicate sealing surfaces that are critical to their function, and these surfaces must be protected in extreme environments.

A specific type of coupling has been designed to cover and protect the exposed sealing surface when the two halves of the coupling are disconnected and not in use, but continue to reside subsea. These couplings are generally referred to as "dummy" couplings within the offshore oil and gas industry. They resemble standard couplings and have the same seals that are used to seal the two halves of the coupling to each other, but they do not permit flow. One issue with conventional dummy couplings is that when connected to a standard coupling subsea, there will be seawater ingression into the standard coupling. This is because the volume between the two halves is filled with seawater, and that volume decreases as the two halves are brought together. The seawater cannot escape because the two halves are sealed to each other and the seawater cannot be compressed. The seawater under pressure forces the valve in the standard coupling open and ingresses into the coupling.

There are dummy couplings that are intended to address the problematic ingress of seawater into the standard coupling. One attempted solution features a chamber that is used to compensate for the volume of seawater that becomes trapped between the coupling halves. A piston slides within the chamber under the seawater pressure to allow seawater to enter the chamber when connecting, and exit the chamber when disconnecting. Such solution essentially constitutes an integrated accumulator for excess seawater subjected to pressure in the dummy coupling, and therefore does not fully expel any trapped seawater.

SUMMARY OF THE INVENTION

It is desirable that a dummy coupling does not ingress seawater, and also that the dummy coupling constrains pressure should the valve in the standard coupling ever leak while being connected to the dummy coupling. The quick coupling system of the present invention provides a volume displacement passage, which allows connection without seawater ingress and further removes the need for a chamber and piston as is typical in conventional configurations.

The dummy coupling of the present invention is configured such that when connecting to a standard coupling with a valve component, any trapped volume of seawater is pushed through a passage defined by the dummy coupling and exits the rear of the dummy coupling. This configuration thus prevents ingression of the seawater into the standard coupling and its associated valve component. As a connection operation is performed to connect the dummy coupling to the standard coupling, a portion of the standard coupling contacts the valve component, and by virtue of such contact the entry into the passage defined by the dummy coupling begins to close. Once the connection is complete, such passage is sealed so the passage will contain pressure should the valve component in the standard coupling ever leak.

The quick coupling configuration of the present disclosure, which addresses trapped seawater with a volume displacement passage, has advantages over conventional configurations that use a piston in a chamber. In such conventional configurations, a piston moves because displaced seawater acts against the piston. If connected in the absence of seawater, the piston may not necessarily move. Accordingly, if the coupling is connected above seawater, in air for example, the piston will likely not move because the air filling the volume between the two halves will be compressed as the two halves are connected. If connected in seawater, the seawater cannot be compressed so it forces the piston to move. In contrast, the valve component in a quick coupling with a volume displacement passage of the present invention is moved mechanically by the standard coupling, so it moves regardless of the environment in which the connection is made.

It is not uncommon for these types of couplings to be connected above seawater "topside" and then placed subsea. If as referenced above the piston of the conventional configuration does not move during the first connection topside, and the coupling is then placed subsea, the sealing surface of the chamber behind the piston could be damaged due to marine growth and calciferous deposits. If the coupling is then disconnected and re-connected while subsea, the piston will now be forced to move and slide against the damaged chamber surface, damaging the seal on the piston and/or the piston itself in the process. Relatedly, the piston that slides within a chamber requires a seal on the piston and a sealing surface in the chamber. The sealing surface in the chamber may be more susceptible to damage depending on the movement, or lack of movement, of the piston.

In contrast, because the valve component in the quick coupling of the present invention, with a volume displacement passage, is moved mechanically by the standard coupling, such configuration avoids the deficiencies of the conventional piston arrangement associated with damage to the sealing surfaces. The valve movement and operation of the quick coupling of the present invention is the same regardless of whether the connection occurs topside or subsea, thereby avoiding the deficiencies of the conventional configurations.

An aspect of the invention, therefore, is a quick coupling assembly having an enhanced configuration for displacement of trapped seawater. In exemplary embodiments, the quick coupling assembly may include a first coupling element and a second coupling element that is inserted into the first coupling element. The first coupling element may include a coupling body and a first valve that is enclosed within the coupling body, and the first valve and the coupling body define a volume displacement passage. When the second coupling element is inserted into the first coupling element, the second coupling element mechanically acts on the first valve of the first coupling element to expel contaminants from the quick coupling assembly via the volume displacement passage.

In exemplary embodiments, the first valve includes a first poppet and a first biasing spring, and the volume displacement passage includes a leak path defined between the coupling body and the first poppet. The first poppet may include an inward contour that is spaced apart from the coupling body to define a portion of the leak path. The first poppet further may include a widened portion that provides a sealing surface when the quick coupling assembly is in a coupled position. The second coupling element mechanically acts on the first poppet when the second coupling element is inserted into the first coupling element to expel the contaminants via the volume displacement passage.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Embodiments of the present invention will now be described with reference to the drawings, wherein like reference numerals are used to refer to like elements throughout. It will be understood that the figures are not necessarily to scale.

Figure 1:
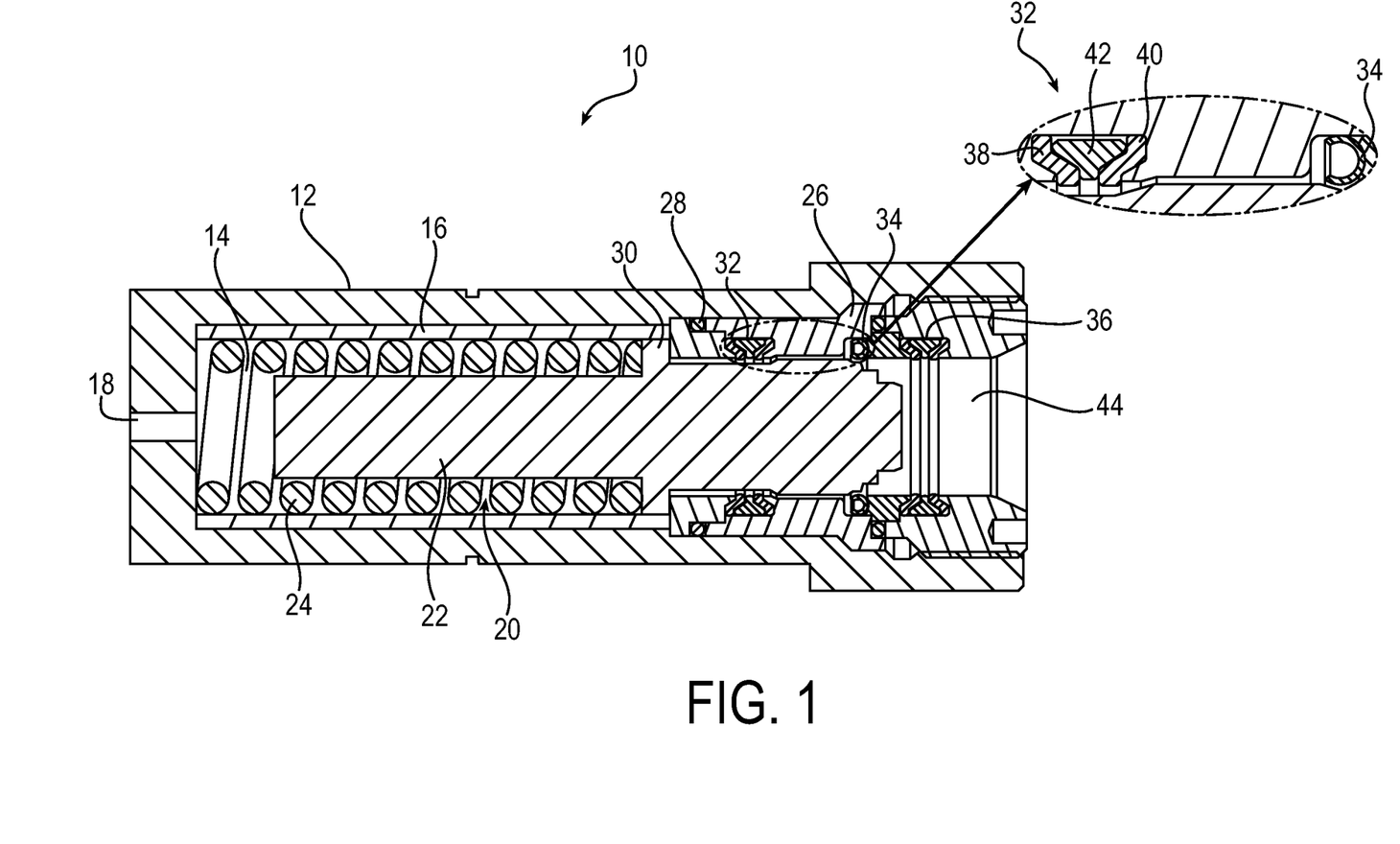
FIG. 1 is a drawing depicting a side cross-sectional view of an exemplary first coupling element that may constitute a component of a coupling assembly in accordance with embodiments of the present invention.

FIG. 1 is a drawing depicting an exemplary first coupling element 10 that may constitute a component of a coupling assembly in accordance with embodiments of the present invention. The first coupling element 10 may be configured as a cap element portion that acts as a dummy coupling element as referenced above. The first coupling element 10 may include a coupling body 12 that acts as an outer housing and defines a bore 14. Optionally, the bore 14 may be lined with a bore liner 16 that prevents any wear on the inner surface of the coupling body 12. The coupling body 12 further may define a vent passage 18 that is configured as part of a volume displacement passage for the venting of seawater and other contaminants from the coupling assembly as further detailed below.

The first coupling element 10 further may include a first valve 20 that is enclosed within the bore 14. The first valve 20 may include a first poppet 22 and a first biasing spring 24. The first coupling element further may include one or more machined housing components 26 that are also encompassed within the bore 14. The machined housing components 26 may be sealed with respect to each other and/or the bore 14 using a plurality of o-rings 28. The first poppet 22 may include a shoulder 30, and the first biasing spring 24 biases the poppet 22 such that the shoulder is pressed against one of the machined housing components in a generally non-sealed metal-to-metal contact engagement. The metal-to-metal contact, therefore, permits a flow of seawater over the first poppet 22.

The machined housing components 26 may be provided with a plurality of sealing elements for providing a sealing engagement with respect to the first poppet 22 and a second coupling element described below. The plurality of sealing elements may include a first seal packing 32, an annular metal seal 34 which in exemplary embodiments has a C-shaped cross-section, and a second seal packing 36. The metal seal 34 therefore may be located between the first seal packing 32 and the second seal packing 36. The first seal packing 32 and the C-shaped metal seal 34 are shown in a close-up view as part of FIG. 1. The first seal packing 32 may include sealing legs 38 and 40 that provide a seat for an energizer element 42 that is positioned centrally relative to the two sealing legs, and that is compressible to energize the seal packing so as to provide an effective seal. The second seal packing 36 generally may be configured comparably as the first seal packing 32, have two sealing legs that provide a seat for a centrally positioned energizer element.

Figure 2:
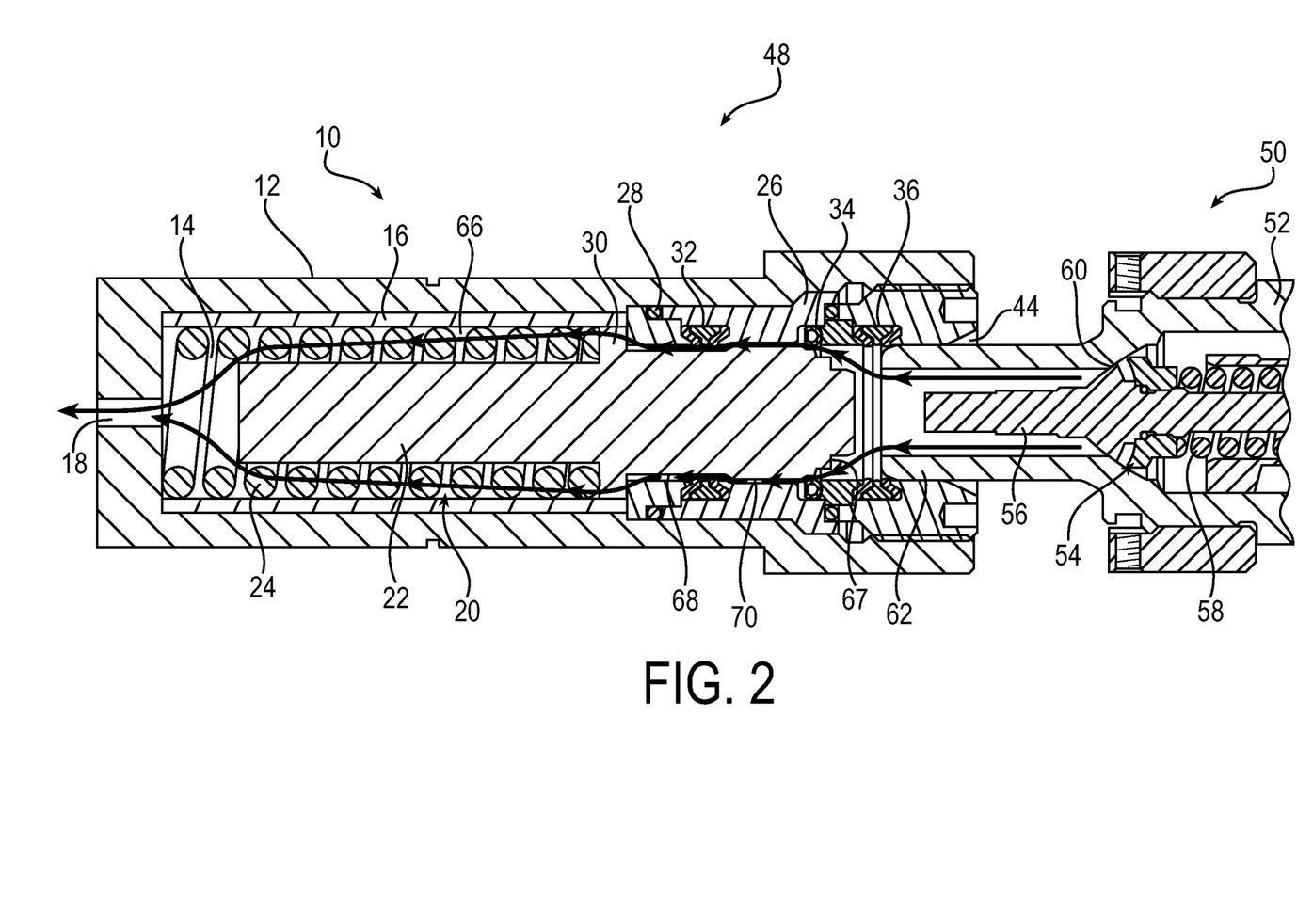
FIG. 2 is a drawing depicting a first state of an exemplary coupling assembly during a progressive insertion of a second coupling element (male) into a first coupling element (female), the first state corresponding to a first degree or position of insertion.
Figure 3:
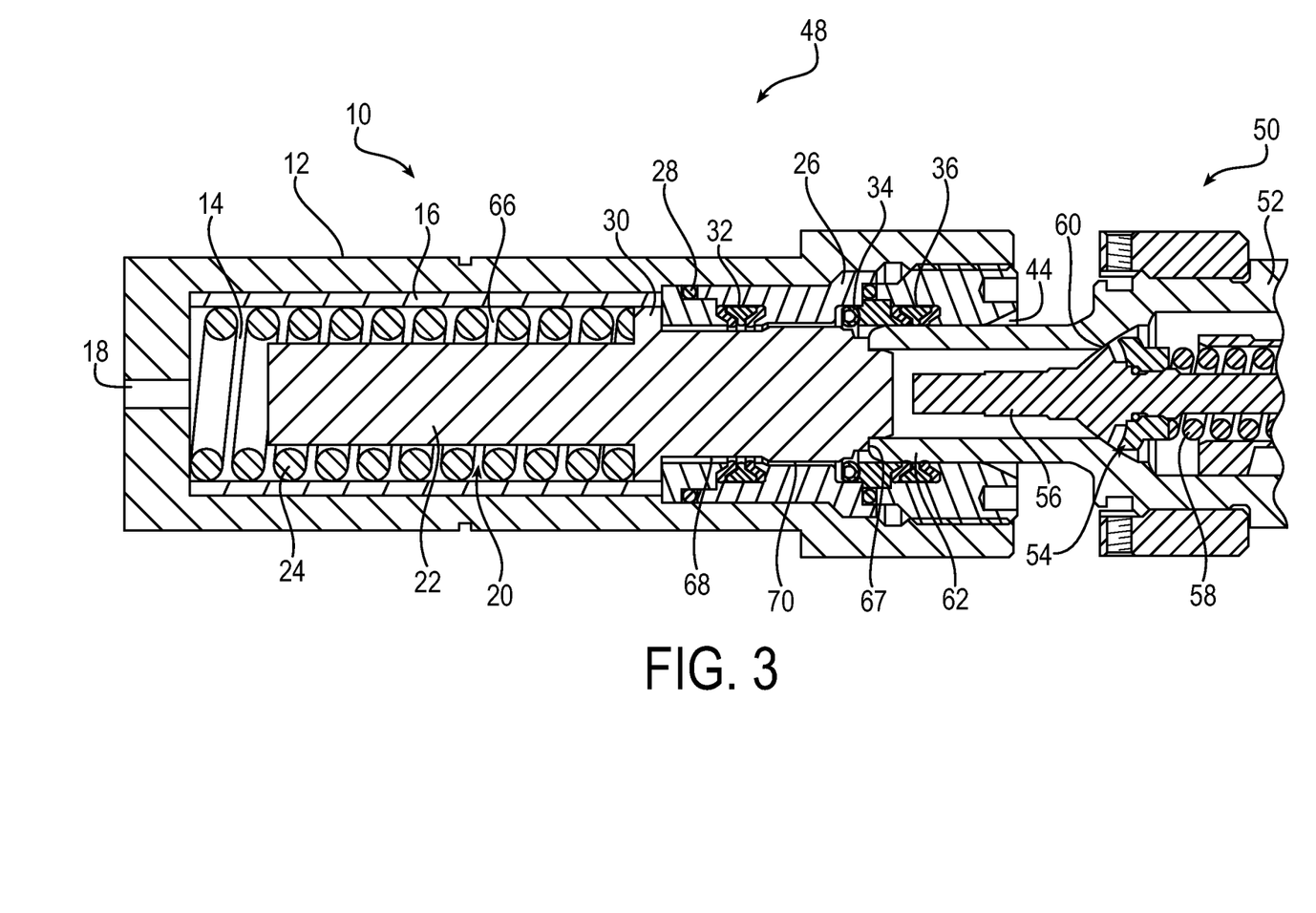
FIG. 3 is a drawing depicting a second state of the exemplary coupling assembly during a progressive insertion of the second coupling element (male) into the first coupling element (female) of FIG. 2, the second state corresponding to a second degree or position of insertion that constitutes a greater degree of insertion as compared to the first state shown in FIG. 2.
Figure 4:
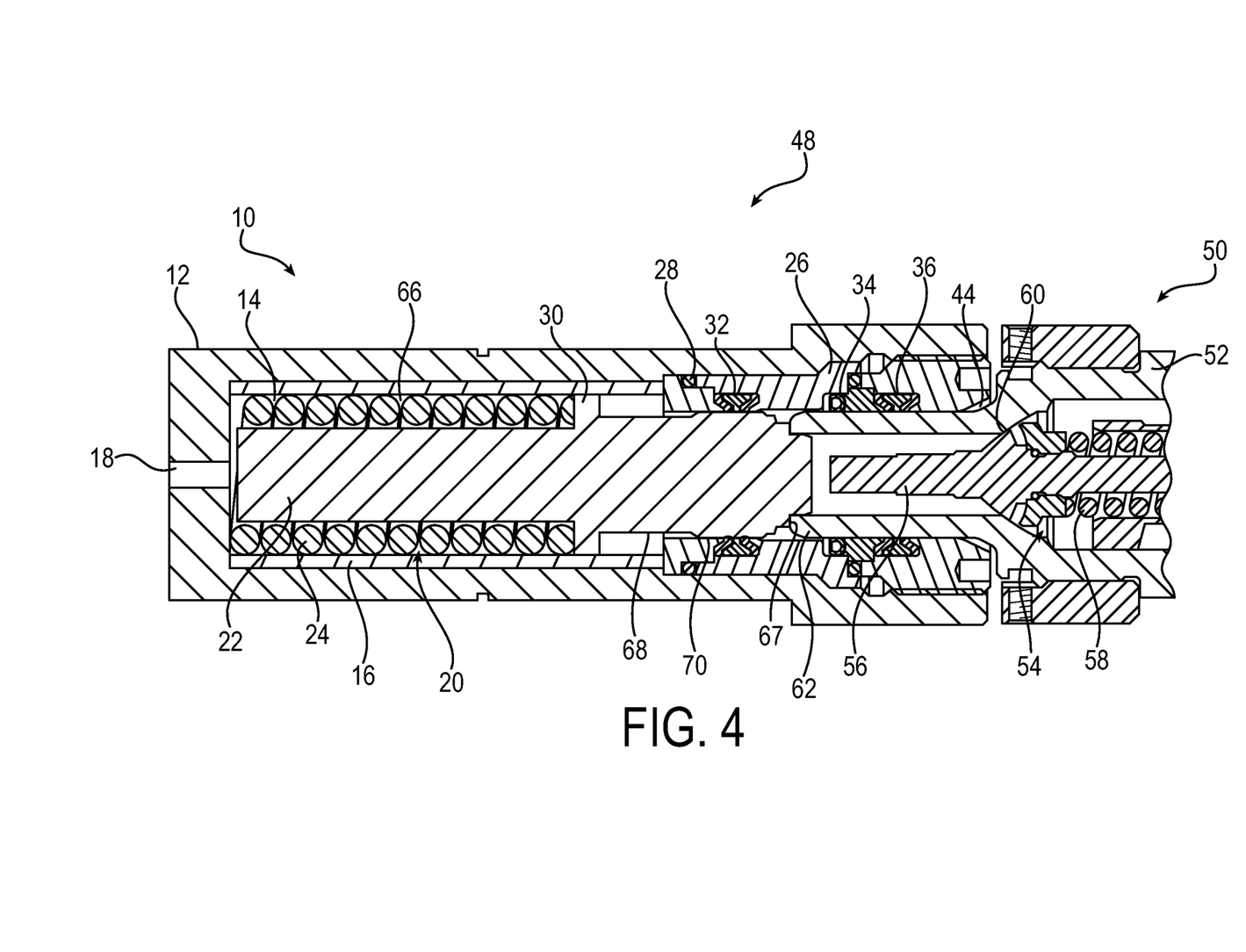
FIG. 4 is a drawing depicting a third state of the exemplary coupling assembly during a progressive insertion of the second coupling element (male) into the first coupling element (female) of FIGS. 2 and 3, the third state corresponding to a third degree or position of insertion that constitutes a greater degree of insertion as compared to the first and second states shown in FIGS. 2 and 3. The third position corresponds to a fully coupled position.

The machined housing components 26 may define a receiving bore 44 that is configured to receive a second coupling element of a coupling assembly. In exemplary embodiments, the first coupling element is a female coupling element and the second coupling element is a male coupling element that is inserted into the female coupling element. FIGS. 2-4 each depicts a side cross-sectional view of an exemplary quick coupling assembly 48 including the first coupling element 10 and a second coupling element 50. FIGS. 2-4 collectively illustrate the progressive insertion of the second coupling element 50 (male) into the first coupling element 10 (female), with each of FIGS. 2-4 corresponding to a different degree or position of insertion.

The quick coupling assembly 48 may constitute one of many couplings in a multi-coupling arrangement mounted together in plates having a centralized locking mechanism, and optionally with one or more satellite locking mechanisms. Accordingly, the individual quick coupling assembly 48 does not need its own individual locking mechanism.

The second coupling element 50 may include a housing 52 that encloses a second valve 54. The second valve 54 may include a second poppet 56 and a second biasing spring 58 that biases the second poppet 56 against a seat 60 that is formed as part of the housing 52. The housing further may extend to form a nose 62 that surrounds the second poppet 56 in a spaced apart configuration. In other words, a space is present between the nose 62 and the second poppet 56, which provides a potential passage for the expulsion of seawater as further described below.

As referenced above, FIGS. 2-4 collectively illustrate the progressive insertion of the second coupling element 50 into the first coupling element 10, with each of FIGS. 2-4 corresponding to a different degree or position of insertion. In this context, a reference to "insertion" is intended to denote a relative movement of the first and second coupling elements. Any one of the coupling elements may be stationary while the other is moved, or both elements may be moved, in a manner such that the relative motion results in the second coupling element being inserted into the first coupling element. The configuration of the present invention provides a mechanism for elimination of seawater (and further more generally any additional contaminants contained with such seawater) within the quick coupling assembly through a volume displacement passage, and further prevents ingress of seawater into the second coupling element 50.

FIG. 2 is a drawing depicting a first state during a progressive insertion of the second coupling element 50 (male) into the first coupling element 10 (female), the first state corresponding to a first degree or position of insertion. To accomplish such result of eliminating the seawater and contaminants, as depicted by the arrowed pathway in FIG. 2 in particular, the first poppet 22 and coupling body 12 may define a leak path 66 for the elimination of seawater through the vent passage 18. In other words, a defined volume displacement passage in exemplary embodiments includes the combined leak path 66 and the vent passage 18. To form such leak path 66, the first poppet 22 may be contoured inward at surface 68 and outward to a widened portion 70, so as to be slightly spaced apart along the contour 68 from the machined housing component 26. In addition, the shoulder 30 may be provided with one or more drill holes or comparable passages to reduce the restriction of the displacement flow along the leak path 66 to the vent passage 18.

In such first position and degree of insertion of the quick coupling assembly 48 depicted in FIG. 2, an end of the nose 62 of the second coupling element 50 is positioned against the second seal packing 36. This provides an initial seal to prevent any flow out of the quick coupling assembly 48 between the nose 62 and the machined housing components 26 of the first coupling element 10. Seawater also is beginning to be expelled out of the quick coupling assembly via the volume displacement passage including the leak path 66 and through the vent passage 18.

FIG. 3 is a drawing depicting a second state during a progressive insertion of the second coupling element 50 (male) into the first coupling element 10 (female) of FIG. 2, the second state corresponding to a second degree or position of insertion that constitutes a greater degree of insertion as compared to the first state shown in FIG. 2. In such second position and degree of insertion of the quick coupling assembly 48 depicted in FIG. 3, the end of the nose 62 mechanically begins to push against the first poppet 22 against the bias of the first biasing spring 24, and the opposing spring force aids in maintaining the integrity of the connection of the quick coupling assembly. In particular, the nose 62 pushes against a stepped end 67 of the first poppet 22. The mechanical movement continues to force seawater along the leak path 66 being adjacent the inward contour surface 68, to be expelled out of the quick coupling assembly through the vent passage 18.

FIG. 4 is a drawing depicting a third state during a progressive insertion of the second coupling element 50 (male) into the first coupling element 10 (female) of FIGS. 1 and 2, the third state corresponding to a third degree or position of insertion that constitutes a greater degree of insertion as compared to the first and second states shown in FIGS. 2 and 3. In such third position of the quick coupling assembly 48 depicted in FIG. 4, the end of the nose 62 has mechanically pushed first poppet 22 essentially against the inner coupling body adjacent the vent passage 18. The third position, therefore, corresponds to a fully coupled position. This further represents a maximum compression of the first biasing spring 24, the force of which, as referenced above, aids in maintaining the integrity of the connection of the quick coupling assembly. In the transition of the position from FIG. 3 to FIG. 4, the second seal packing 36 makes contact with the nose 62 and a certain volume of fluid becomes enclose. A sealing diameter may be configured to have the same diameter as the sealing surface on the second coupling member in order to avoid any more volume changes.

In this third position, the widened portion 70 of the first poppet 22 is now pressed against the first seal packing 32, as emphasized by the oval indicator in FIG. 4. This provides an effective seal against the ingress of seawater back into the area of the second coupling element 50 and its associated valve components. In this manner, seawater and/or any related contaminants have effectively been expelled from the quick coupling assembly 48 and sealed particularly against ingress of seawater and other contaminants back into the operative valve components of the second coupling element 50.

The configuration of the present invention thus addresses trapped seawater with a volume displacement passage including the leak path 66 and vent passage 18, which has advantages over conventional configurations including the use of a piston in a chamber as an accumulator for trapped seawater. In the conventional piston configuration, the piston moves because displaced seawater acts against the piston with substantial pressure. If connected in the absence of seawater, the piston may not necessarily move, which renders the piston configuration ineffective. If the quick coupling is connected above seawater, in air in particular, the piston will likely not move because the air filling the volume between the two halves will be compressed as the two halves are connected. If connected in seawater, the seawater cannot be compressed so the pressure forces the piston to move. The first valve 20 in the quick coupling of the present invention, with a volume displacement passage, is moved mechanically by the second coupling element configured as a standard coupling, so the valve poppet 22 moves regardless of the environment in which the connection is performed.

As described previously, it is not uncommon for these types of quick couplings to be connected above seawater "topside" and then placed subsea. Accordingly, if the piston in the conventional configurations does not move during the first connection topside, and is then placed subsea, the sealing surface of the chamber behind the piston could be damaged due to marine growth and calciferous deposits. If the coupling is then disconnected and re-connected while subsea, the piston will now be forced to move and slide against the damaged chamber surface, damaging the seal on the piston and/or the piston itself in the process. Since the first valve 20 in the quick coupling of the present invention with the volume displacement passage is moved mechanically by the standard coupling (particularly by the nose 62 of the second coupling element 50), the present invention does not suffer from the deficiencies of the piston-type conventional configuration. The valve movement in the present invention is the same regardless of whether the quick coupling is connected topside or subsea, which prevents ingress of water and damage to the sealing surfaces.

In addition, the conventional piston that slides within a chamber requires a seal on the piston and a sealing surface in the chamber. The sealing surface in the chamber may be more susceptible to damage depending on the movement, or lack of movement, of the piston. This additional source of potential damage in the coupling is avoided in the present invention using the volume displacement passage, as the sealing surface in the present invention is limited essentially only to the widened portion 70 of the first poppet 22 sealing against the first seal packing 32.

Figure 5:
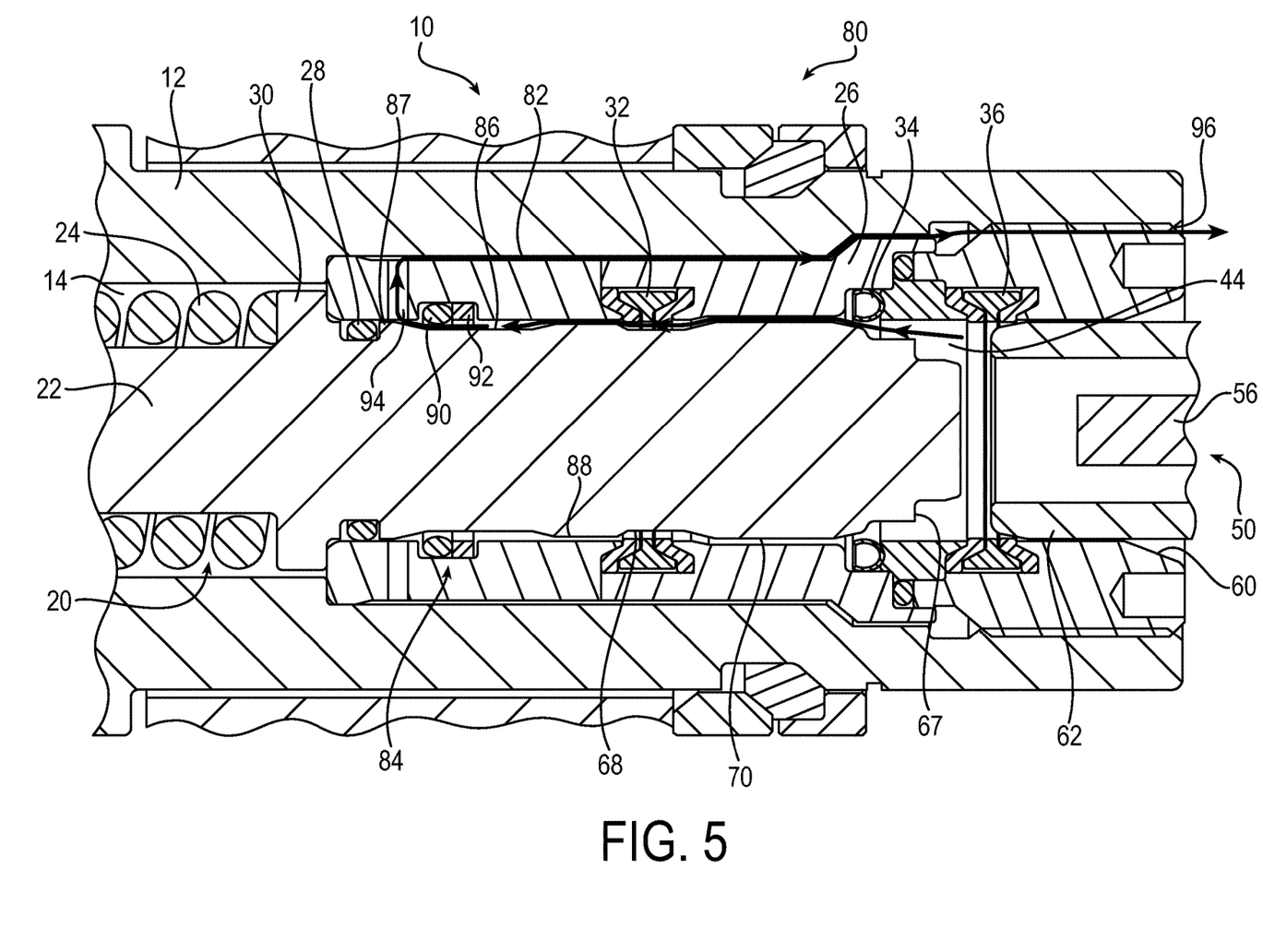
FIG. 5 is a drawing depicting another exemplary embodiment of a first state of an exemplary coupling assembly during a progressive insertion of a second coupling element (male) into a first coupling element (female), the first state corresponding to a first degree or position of insertion comparably as in FIG. 2.
Figure 6:
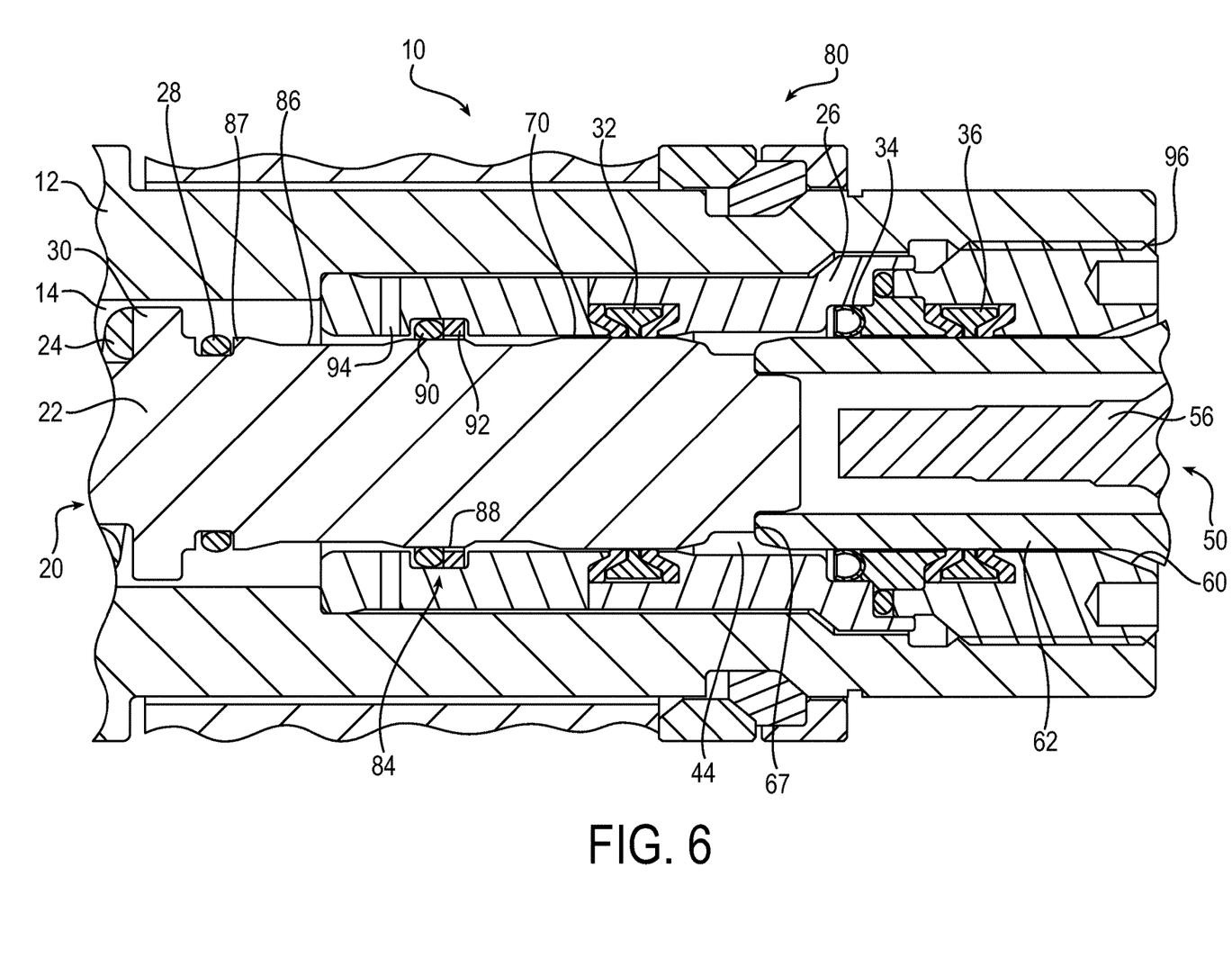
FIG. 6 is a drawing depicting a third state of the exemplary coupling assembly of FIG. 5 during a progressive insertion of the second coupling element (male) into the first coupling element (female). 5, the third state corresponding to a third degree or position of insertion that constitutes a greater degree of insertion as compared to the first and second states shown in FIGS. 2, 3, and 5. The third position corresponds to a fully coupled position comparably as in FIG. 4.

FIGS. 5 and 6 depict an exemplary embodiment of another configuration of a quick coupling assembly 80 that is a variation of the quick coupling assembly 48 of FIGS. 1-4. The quick coupling assemblies 48 and 80 bear similarities, and thus like components are identified with like reference numerals in FIGS. 5-6 as compared to FIGS. 1-4. The embodiment of FIGS. 5-6 differs principally in the addition of further sealing elements that result in a different configuration of the volume displacement passage as compared to the volume displacement passage in the embodiment of FIGS. 1-4.

FIG. 5 is a drawing depicting the exemplary embodiment of the quick coupling assembly 80 in a first state during a progressive insertion of the second coupling element (male) 50 into the first coupling element (female) 10. The first state of FIG. 5 corresponds to a first degree or position of insertion comparably as in FIG. 2. To accomplish such result of eliminating the seawater and contaminants, as depicted by the arrowed pathway in FIG. 5 in particular, the first poppet 22 and coupling body 12 may define a leak path 82 for the elimination of seawater. To form such leak path 82, the first valve 20 may include a dedicated sealing component 84 spaced apart from the first seal packing 32 oppositely from the second seal packing 36, and the first poppet 22 further may include a second inward contoured surface 86. The second inward contoured surface 86 rises at one end to form a ridge 87. In addition, the first inward contoured surface 68 and the second inward contoured surface 86 of the first poppet may be spaced apart by a second widened portion 88 in addition to the first widened portion 70 of the previous embodiment. In exemplary embodiments, the dedicated sealing component 84 may include another o-ring 90 supported against internal pressures by a backup ring 92. In addition, the machined components 26 may be provided with one or more drill holes 94 or comparable passages to define a portion of the volume displacement passage, which ends in a vent passage 96 in the coupler body 12. In this manner, in this embodiment the volume displacement passage may include the one or more drill holes 94, the leak path 82, and the vent passage 96.

In such first position and degree of insertion of the quick coupling assembly 80 depicted in FIG. 5, similarly to the first embodiment of FIG. 2, an end of the nose 62 of the second coupling element 50 is positioned against the second seal packing 36. This provides an initial seal to prevent any flow out of the quick coupling assembly 80 between the nose 62 and the machined housing components 26 of the first coupling element 10. Seawater also is beginning to be expelled out of the quick coupling assembly via the volume displacement passage. In the embodiment of FIG. 5, the ridge 87 and o-ring 28 form a seal such that any trapped seawater is expelled through the drill hole 94 portion of the volume displacement passage. The trapped seawater then flows through the remainder of the volume displacement passage, including along the leak path 82 and out through the vent passage 96.

FIG. 6 is a drawing depicting the third state of the quick coupling assembly 80 during a progressive insertion of the second coupling element (male) into the first coupling element (female) of FIG. 5, the third state corresponding to a third degree or position of insertion that constitutes a greater degree of insertion as compared to the first and second states shown in FIGS. 2, 3, and 5. Again, the third position corresponds to a fully coupled position, which is comparable in FIG. 6 as in FIG. 4.

In such third or coupled position of the quick coupling assembly 80 depicted in FIG. 6, similarly as in the embodiment of FIG. 4, the end of the nose 62 has mechanically pushed first poppet 22 essentially against the inner coupling body (not shown in FIG. 6). In this third position, also as in the previous embodiment, the first widened portion 70 of the first poppet 22 is now pressed against the first seal packing 32. This provides an effective seal against the ingress of seawater back into the area of the second coupling element 50 and its associated valve components. In this manner, seawater and/or any related contaminants have effectively been expelled from the quick coupling assembly 80 and sealed particularly against ingress of seawater and other contaminants back into the operative valve components of the second coupling element 50.

Furthermore, in the embodiment of FIG. 6, the second widened portion 88 of the first poppet 22 is now pressed against the dedicated sealing element 84. This provides another effective seal against the ingress of seawater, which specifically prevents seawater from coming back into the area of the first seal packing 32. This configuration, therefore, prevents damage to the first seal packing 32 by the seawater and any included marine life or calciferous deposits, which enhances the overall sealing function to prevent seawater and/or any related contaminants ultimately from reaching back into the operative valve components of the second coupling element 50. A small amount of isolated seawater may be trapped adjacent to the first contoured surface 68, but such amount is de minimis and typically insufficient to have any negative effect on the first seal packing 32.

An aspect of the invention, therefore, is a quick coupling assembly having an enhanced configuration for displacement of trapped seawater. In exemplary embodiments, the quick coupling assembly may include a first coupling element and a second coupling element that is inserted into the first coupling element, and the first coupling element includes a coupling body and a first valve that is enclosed within the coupling body, and the first valve and the coupling body define a volume displacement passage. When the second coupling element is inserted into the first coupling element, the second coupling element mechanically acts on the first valve of the first coupling element to expel contaminants from the quick coupling assembly via the volume displacement passage. The quick coupling assembly may include one or more of the following features, either individually or in combination.

In an exemplary embodiment of the quick coupling assembly, the first valve includes a first poppet and a first biasing spring, and the volume displacement passage includes a leak path defined between the coupling body and the first poppet.

In an exemplary embodiment of the quick coupling assembly, the first poppet includes an inward contour that is spaced apart from the coupling body to define a portion of the leak path.

In an exemplary embodiment of the quick coupling assembly, the first poppet further includes a widened portion that provides a sealing surface when the quick coupling assembly is in a coupled position.

In an exemplary embodiment of the quick coupling assembly, the second coupling element mechanically acts on the first poppet when the second coupling element is inserted into the first coupling element to expel the contaminants via the volume displacement passage.

In an exemplary embodiment of the quick coupling assembly, the first poppet has a stepped end, and a nose of the second coupling element mechanically acts on the stepped end to move the first poppet to expel the contaminants via the volume displacement passage.

In an exemplary embodiment of the quick coupling assembly, the volume displacement passage includes a vent passage defined by the coupling body.

In an exemplary embodiment of the quick coupling assembly, the first coupling element further comprises a machined housing component and a plurality of sealing elements embedded within the machined housing component.

In an exemplary embodiment of the quick coupling assembly, the plurality of sealing elements comprises a first seal packing, a metal seal, and a second seal packing.

In an exemplary embodiment of the quick coupling assembly, in a first position of insertion of the second coupling element into the first coupling element, a nose of the second coupling element is positioned against the second seal packing to form a seal.

In an exemplary embodiment of the quick coupling assembly, in a second position of insertion of the second coupling element into the first coupling element, the nose of the second coupling element is positioned against the first valve to mechanically act on the first valve.

In an exemplary embodiment of the quick coupling assembly, in a coupled position of the coupling assembly, a poppet of the first valve is positioned against the first seal packing to form a seal against ingress of contaminants into the second coupling element.

In an exemplary embodiment of the quick coupling assembly, the plurality of sealing elements further may include a dedicated sealing element spaced apart from the first seal packing oppositely from the second seal packing.

In an exemplary embodiment of the quick coupling assembly, the volume displacement passage includes a drill hole through the machined housing component, and in the first position of insertion the plurality of sealing elements is configured to provide a seal so as to direct contaminants through the drill hole.

In an exemplary embodiment of the quick coupling assembly, in the coupled position of the coupling assembly, the poppet of the first valve further is positioned against the dedicated sealing element to form a seal against ingress of contaminants to the first seal packing.

In an exemplary embodiment of the quick coupling assembly, the dedicated sealing element comprises an o-ring that is supported by a backup ring.

In an exemplary embodiment of the quick coupling assembly, each of the first and second seal packings comprises a first leg, a second leg, and an energizer element, wherein the legs forms a seat that receives the energizer element.

In an exemplary embodiment of the quick coupling assembly, the plurality of sealing elements further includes a metal seal located between the first and second seal packings.

In an exemplary embodiment of the quick coupling assembly, the metal seal is a C-shaped seal.

In an exemplary embodiment of the quick coupling assembly, the first coupling element includes a bore liner that lines an inner surface of the coupling body.

In an exemplary embodiment of the quick coupling assembly, the second coupling element includes a housing and a second valve enclosed within the housing, and the housing has a nose extension that mechanically acts on the first valve when the second coupling element is inserted into the first coupling element.

In an exemplary embodiment of the quick coupling assembly, the second valve includes a second poppet and a second biasing spring, and the second biasing spring biases the second poppet against a valve seat formed on an inner surface of the housing.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A quick coupling assembly comprising:
   a first coupling element and a second coupling element that is inserted into the first coupling element;
   the first coupling element comprising a coupling body and a first valve that is enclosed within the coupling body, and the first valve and the coupling body define a volume displacement passage;
   the first valve including a first end and a second end opposite from the first end;
   the volume displacement passage includes a vent passage defined by the coupling body that is located adjacent to the second end of the first valve, configured to allow expulsion of contaminants out of the quick coupling assembly through the vent passage;
   wherein when the second coupling element is inserted into the first coupling element, the second coupling element mechanically acts on the first end of the first valve of the first coupling element to force contaminants past the second end of the first valve to expel contaminants out of the quick coupling assembly through the vent passage of the volume displacement passage; and
   wherein the first valve includes a first poppet and a first biasing spring positioned between the first end and the second end, and the volume displacement passage includes a leak path defined between the coupling body and the first poppet that extends from the first end of the first valve past the first poppet and the first biasing spring to the vent passage;
   wherein:
   the first coupling element further comprises a machined housing component and a plurality of sealing elements embedded within the machined housing component, and the plurality of sealing elements comprises a first seal packing and a second seal packing;
   in a first position of insertion of the second coupling element into the first coupling element, a nose of the second coupling element is positioned against the second seal packing to form a seal;
   in a second position of insertion of the second coupling element into the first coupling element, the nose of the second coupling element is positioned against the first valve to mechanically act on the first valve; and
   in a coupled position of the coupling assembly, a poppet of the first valve is positioned against the first seal packing to form a seal against ingress of contaminants into the second coupling element.

2. The quick coupling assembly of claim 1, wherein the first poppet includes an inward contour that is spaced apart from the coupling body to define a portion of the leak path.

3. The quick coupling assembly of claim 2, wherein the first poppet further includes a widened portion that provides a sealing surface when the quick coupling assembly is in a coupled position.

4. The quick coupling assembly of claim 1, wherein the second coupling element mechanically acts on the first poppet when the second coupling element is inserted into the first coupling element to expel the contaminants via the volume displacement passage.

5. The quick coupling assembly of claim 4, wherein the first poppet has a stepped end, and a nose of the second coupling element mechanically acts on the stepped end to move the first poppet to expel the contaminants via the volume displacement passage.

6. The quick coupling assembly of claim 1, wherein the plurality of sealing elements further comprises a dedicated sealing element spaced apart from the first seal packing oppositely from the second seal packing.

7. The quick coupling assembly of claim 6, wherein the volume displacement passage includes a drill hole through the machined housing component, and in the first position of insertion the plurality of sealing elements is configured to provide a seal so as to direct contaminants through the drill hole.

8. The quick coupling assembly of claim 7, wherein in the coupled position of the coupling assembly, the poppet of the first valve further is positioned against the dedicated sealing element to form a seal against ingress of contaminants to the first seal packing.

9. The quick coupling assembly of claim 8, wherein the dedicated sealing element comprises an o-ring that is supported by a backup ring.

10. The quick coupling assembly of claim 1, wherein each of the first and second seal packings comprises a first leg, a second leg, and an energizer element, wherein the legs form a seat that receives the energizer element.

11. The quick coupling assembly of claim 1, wherein the plurality of sealing elements further comprises a metal seal located between the first and second seal packings.

12. The quick coupling assembly of claim 11, wherein the metal seal is a C-shaped seal.

13. The quick coupling assembly of claim 1, wherein the first coupling element includes a bore liner that lines an inner surface of the coupling body.

14. The quick coupling assembly of claim 1, wherein the second coupling element includes a housing and a second valve enclosed within the housing, and the housing has a nose extension that mechanically acts on the first valve when the second coupling element is inserted into the first coupling element.

* * * * *